United States Patent [19]
Richardson

[11] Patent Number: 5,995,546
[45] Date of Patent: Nov. 30, 1999

[54] DIGITAL INTEGRATOR FOR PULSE-DENSITY MODULATION USING AN ADDER CARRY OR AN INTEGRATOR OVERFLOW

[75] Inventor: Donald C. Richardson, Plano, Tex.

[73] Assignee: Texas Instruments Incorporated, Dallas, Tex.

[21] Appl. No.: 08/941,516

[22] Filed: Sep. 30, 1997

[51] Int. Cl.$^6$ .............. H03D 3/18; H03M 1/66; G06F 7/50
[52] U.S. Cl. .............. 375/237; 341/144; 708/706
[58] Field of Search ..................... 375/237, 242, 375/238; 341/144, 152; 708/101, 706, 707; 327/57; 332/101

[56] References Cited

U.S. PATENT DOCUMENTS

| | | | |
|---|---|---|---|
| 4,819,252 | 4/1989 | Christopher | 375/240 |
| 5,012,437 | 4/1991 | Recker et al. | 708/101 |
| 5,031,131 | 7/1991 | Mikos | 708/726 |
| 5,059,979 | 10/1991 | Micic et al. | 341/152 |
| 5,065,353 | 11/1991 | Nojiri et al. | 708/707 |

*Primary Examiner*—Chi H. Pham
*Assistant Examiner*—Khai Tran
*Attorney, Agent, or Firm*—April M. Mosby; W. James Brady; Richard L. Donaldson

[57] ABSTRACT

A pulse-density modulator (10) for producing a pulse density output signal on an output line (36) representing successive parallel digital input words on input terminals (12) has a plurality of full adders (14, 16, 18), each having a carry output (C), and an input (A) for receiving a respective bit of a concurrently applied bit of the parallel input digital words. The overflow output (C) of each of the adders (14, 16, 18) is added as an input (B) of an adder of a next successively higher bit order. A latch (30) receives the carry output (C) of one of the adders (14) in a most significant bit position, with an output of the latch provides a pulse density modulated signal on an output line (36) representing the input digital words. A clock (35) applies clock pulses to the latches (20, 22, 24, 30) at a frequency at least as high as the frequency at which the successive parallel digital input words are applied to the inputs (12) of the adders (14, 16, 18).

10 Claims, 1 Drawing Sheet

DIGITAL INTEGRATOR FOR PULSE-DENSITY MODULATION USING AN ADDER CARRY OR AN INTEGRATOR OVERFLOW

BACKGROUND OF THE INVENTION

1. Field of the Invention

This invention relates to improvements in pulse density modulator circuits, and more particularly to improvements in pulse density modulator circuits of the type which receive sequentially applied input parallel digital words or signals.

2. Relevant Background

Many applications exist in which it is desirable to convert a series of parallel digital words into a pulse density signal. For example, in many telecommunications applications, voice or other sounds are digitized and transmitted as parallel digital words. Upon reception, the digital words are converted into a form that can be converted into audio, reproducing the original voice or sounds. One way by which this has been done has been by converting the received digital words into a pulse density modulated signal, then passing the pulse density modulated signal through a low pass filter to produce an analog signal.

Typically, the pulse density modulation of the input digital words involves framing the words, that is, treating each, word individually to produce a set output stream of pulses of length corresponding to the number of bit values that may be represented by the input word. For example, if an n-bit input word is modulated, the pulse density modulation signal requires a frame of 10 pulses long to represent the word. However, if the pattern is changed in the middle of the frame discontinuities at the output may occur. On the other hand, if the pattern is only allowed to be changed at the end of a frame, the delay is quantized to the frame length, which is $2^n$ clocks.

Thus, what is needed is a method and apparatus for providing a pulse density modulated signal to represent an input sequence of parallel words that can be changed without resulting in output discontinuities, and which does not require data framing.

SUMMARY OF THE INVENTION

Thus, according to a broad aspect of the invention, a pulse-density modulator is provided for producing a pulse density output signal representing successive parallel digital input words. The modulator includes an adder for adding and accumulating the successive digital input words, and a carry output and a latch for receiving the carry output of the adder, an output of the latch providing a pulse density modulated signal representing the input digital words. The adder may be, for example, a full digital adder, a ripple carry adder, an integrator, or the like. A clock supplies clock pulses to the latch to latch the carry output therein. The clock has a frequency at least as high as a frequency of application of input digital words. A circuit may be provided for initializing the latch, for example, upon power up.

According to another broad aspect of the invention, a pulse-density modulator is presented for producing a pulse density output signal representing successive parallel digital input words. The pulse-density modulator has a plurality of full adders, each having an sum output, a carry output, a first input for receiving a respective bit of a concurrently applied one of the parallel input digital words, a second input for receiving a carry output of next full adder in a position of a lower bit order, and a third input. The second input of the full adder in a least-significant-bit position is connected to receive a zero state input. A first latch receives the carry output of one of the full adders in a most significant bit position and provides on its output a pulse density modulated signal representing the input digital words. A plurality of second latches each have an input connected to a sum output, and an output connected to a third input, of a respective one of the full adders. A clock for producing clock pulses applied to the first and second latches the carry and integrator outputs respectively therein. The clock may have a frequency at least as high as a frequency of application of input digital words. In addition, the latches may be initialized at start-up, power-up, or other desired time.

According to still another broad aspect of the invention, a method is presented for producing a pulse-density signal representing successive parallel digital input words. The method includes adding and accumulating successive values of a digital input word. A carry output of the accumulated successive values is provided, and the carry values are periodically latched to provide a pulse density modulated output.

According to yet another broad aspect of the invention, a pulse-density modulator is presented for producing a pulse density output signal representing successive parallel digital input words. The pulse-density modulator includes a plurality of integrators. Each integrator has an overflow output, and an input for receiving a respective bit of a concurrently applied one of the parallel input digital words. The overflow output of each of the integrator circuits is added to an input of an integrator circuit in a next successively higher bit order. A latch receives the overflow output of one of the full adders in a most significant bit position. An output of the latch provides a pulse density modulated signal representing the input digital words. A clock produces clock pulses applied to the plurality of integrators and the first latch.

BRIEF DESCRIPTION OF THE DRAWING

The invention is illustrated in the accompanying drawing, in which.

DETAILED DESCRIPTION OF THE PREFERRED EMBODIMENTS

Figure 1:
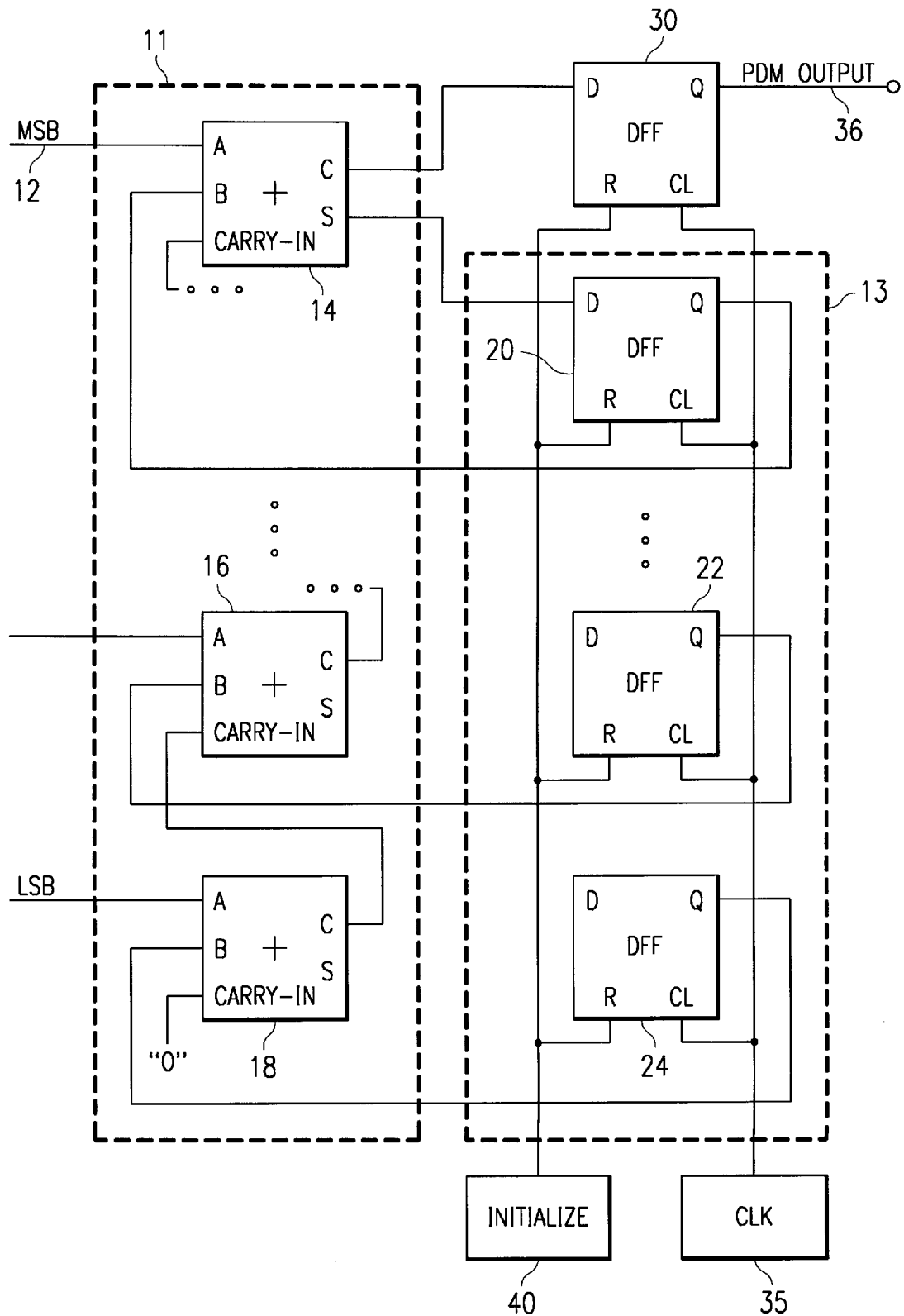
FIG. 1 is an electrical schematic diagram of a pulse density modulator circuit, in accordance with a preferred embodiment of the invention, using full adder circuits.

A digital integrator can be used for pulse-density modulation as shown in FIG. 1. In the circuit of FIG. 1, parallel digital input words are successively applied to the input, and a pulse-density modulated signal is produced at the output. It should be noted that the term "word" used herein is intended to mean a series of n binary bits arranged from a least-significant bit (LSB) to a most-significant-bit (MSB), where n can be any integer. The carry output of the MSB of the summer of the integrator is the output. Latching this output eliminates glitches and results in better control of the output pulse width.

The input is a binary Word n bits wide having values from 0 to $2^n-1$. The output is a steam of pulses in which the number of pulses that are active per $2^n$ clocks is equal to the input value. A benefit of this implementation is that, if the latches are only reset at power-up or initialization, the modulator will continue to track the value of the input at every clock without any discontinuities at the output. Also, the delay of a signal through this circuit is quantized at the clock frequency, which can be high relative to the signed frequency.

Thus, with reference now particularly to FIG. 1, an electrical schematic diagram of a preferred embodiment of a circuit 10 for use in producing a pulse stream is shown. The circuit to operates to produce a pulse density modulated output signal on line 36 from a plurality of input states applied to the input terminals 12. Although, digital words are often thought of being of a particular width, for example, 8 bits, the input states may be, for example, an applied digital word of any convenient width. The input words applied to input terminals 12 may be in binary weight order from the least significant bit (LSB) to most significant bit (MSB), as shown.

In the embodiment shown, the circuit 10 includes an adder circuit 11 having a number of full adder circuits 14, . . . , 16, and 18, each of which has three inputs, denoted "A", "B", and "carry-in". In addition, each of the full adder circuits 14, . . . , 16, and 18 have a sum output "S" and a carry output, "C". Although three full adder circuits 14, 16, and 18 are shown, it will be appreciated that any number of adder circuits can be used in the circuit 10, depending upon the width of the input word. Moreover, although separate adder circuits are shown, it should be understood that other adder implementations can be equally advantageously employed. For example, the adder function can be accomplished by a single adder having a single carry output which operates to continuously accumulate the values of the respective inputs applied thereto. Alternatively, the adder function can be provided by a look-up table to look up successive sums resulting from successively applied input values. Or, the adder function can be accomplished by a computer under software control. Other implementations will be apparent to those skilled in the art.

In operation, in the embodiment shown, the adder circuits 14, . . . , 16, and 18 asynchronously operate to immediately add the inputs at the A, B, and carry-in respective input terminals, in a manner similar to that of a ripple adder circuit, without a clocking requirement.

A latch circuit 13 is provided to furnish each of the full adder circuits 14, . . . , 16, and 18 a respective latch. In the circuit illustrated, the latches are provided by D-type flip-flops 20, . . . , 22, and 24, respectively, each associated one of the full adder circuits 14, . . . , 16, and 18. More particularly, the sum output of the full adder circuits 14, . . . , 16, and 18 are connected to the respective D inputs of the D-type flip-flops 20, . . . , 22, and 24. In addition, the Q output of each of the flip-flops 20, 22, and 24 are connected to the "B" input of the respective full adder 14, . . . , 16, and 18, with which each D-type flip-flop is associated. The latch circuit 13 may be included as a part of the adder 11 in some embodiments, if desired.

The carry "C" output of each of the full adders 14, . . . , 16, and 18 is connected to the carry-in input of the full adder in the position of the next higher binary weight of the input word on the input terminal 12. Thus, the carry output of the adder 18 is connected to the carry-in input of the adder 16, and so on, to configure the adder 11 as a ripple carry adder.

The carry-in input of the adder 18 is the least significant bit position of the input word is connected to a "0" binary input state, and the carry output of the adder 14 is the most significant bit position is connected to an output D-type flip-flop 30. The Q output of the D-type flip-flop 20 on line 36 delivers the output from the circuit 10 and represents a pulse density modulated signal of the input word applied to terminals 12.

Each of the D-type flip-flops 10, . . . , 22, 24, and 30 is clocked by a clock signal generated by a clock generator 35. The clock frequency can be the same as or larger than the frequency at which the input words are applied to the input.

In addition, the D-type flip-flops 20, . . . , 22, 24, and 30 may be reset by a reset signal developed by an initialize circuit 40.

In operation, as each digital word is sequentially applied to the terminals 12, its individual bits are added in the respective adders 14, . . . , 16, and 18 in the weight position of the respective input bits, and the sum output is latched in the respective D-type flip-flop output latches 20, . . . , 22, and 24. The output from the latches 20, . . . , 22, and 24 are re-added to the input on the "B" input terminals of the respective adders 14, . . . , 16, and 18. When a carry-out signal occurs, it is conducted to the adder in the position of the next higher order of the binary input word, and is added thereto. It will therefore be appreciated that the output seen on the output line 36 from the D-type flip-flop 30 will provide a pulse density modulated representation of the input word.

More particularly, the signal on the pulse density modulated output line 36 will provide a number of pulses on the PDM output line 36 which corresponds to the number represented by the parallel word applied to the input terminals 12. Thus, for example, if the input parallel word is eight bits wide, the output on the PDM output line 36 would represent, in 256 clock cycles, the number represented by the binary word applied to the input terminals 12. The output on the PDM output line 36 can, therefore, be converted into an analogue signal merely by applying the pulse train on the PDM output line 36 to a low pass filter (not shown).

Accordingly, as mentioned, the pulse density modulated output on line 36 appears as a series of pulses, having an average number of pulses over any output set which correspond to the value of the binary input word. So, if 256 output pulse periods are observed, a number of pulses representing an input word which is 8-bits wide will be observed. Moreover, the output is a dynamic representation of the parallel input words. If the input word is changed, for example, the change of input word nevertheless results in a continuous function on the output representing continuous steps between the first and second words as successive sets of 256 pulses are observed.

It is noted that ordinarily, to avoid discontinuities, the count maintained by the latches 20, . . . , 22, and 24 is not cleared each time a new word is applied to the input terminals 12. The circuit accumulates the past history as long as the latches 20, . . . , 22, and 30 are not cleared, so that the output represents the sum of all of the input words throughout the past history of operation of the circuit 10. Thus, the output average of the last $2^n$ clock cycles is the average of the last input values. The averaging effect of the circuit provides a low pass filtering effect on the output data. In general operation, therefore, the latches 20, . . . , 22, 24, and 30 are cleared or initialized only at power up, or at another time when it is desired to restart the count, for example by a reset or initialize circuit 40.

Thus, another feature of the invention that will be apparent to those skilled in the art is that if the word that is applied to the input terminals 12 changes before the total number of output pulses on the PDM output line 36 have occurred that correspond to the number of possible states represented by the input word, the new output will represent a linear number proportionally between the two consecutive or sequentially applied parallel words on the input terminals 12. Therefore, changes in the input word to the circuit 10 are linearly processed, and do not produce discontinuities or other undesirable effects of the output signal appearing on the PDM output line 36.

It will be appreciated that the respective adders and latches in each bit position constitute essentially an integrator circuit, with the adder serving the function of accumulating input values until they overflow at the carry output. With each being latched by the respective latch circuit associated with the adders, the overflow carry effects of each position of the binary weighted inputs are carried forward to the next higher binary position. Thus, the circuit 10 could easily be implemented as a series of integrator circuits. The carry output of each of the integrator circuits would be represented by an overflow output to cause each binary calculation to be carried to the next higher binary weighted position. The digital integrator implementation spaces the active output pulses equally (except for the minor variations due to time quantization at the clock frequency). This reduces the amplitude of low-frequency components in the output.

One use for which the circuit 10 can be used, for example, is to develop a control voltage. Such control voltage may be useful, for instance, to control the gain of an amplifier of another stage in response to a parallel digital input word, for example, in a telecommunications application, or the like. The input words may be provided, for example, by a digital signal processor, or other source. Other uses for the circuit 10 may be to provide a D/A converter, or to provide low frequency filter. Still other uses will be apparent to those skilled in the art.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A pulse-density modulator for producing a pulse density output signal representing successive parallel digital input words, comprising:

a plurality of adders, each having an sum output, a carry output, a first input for receiving a respective bit of a concurrently applied one of said parallel input digital words, a second input, and a third input, said carry output of each of said adders being connected to said second input of an adder in a next higher bit order, except the carry output of an adder in a most significant bit position, and a second input of an adder in a least-significant-bit position being connected to receive a zero state input;

a first latch for receiving the carry output of said adder in said most significant bit position, an output of said first latch providing a pulse density modulated signal representing said input digital words;

a plurality of second latches, each having an input connected to a sum output, and an output connected to a third input of a respective one of said adders;

and a clock for producing clock pulses applied to said first and second latches to latch said carry and sum outputs respectively therein.

2. The pulse-density modulator of claim 1 further comprising a circuit for initializing said latches.

3. The pulse-density modulator of claim 1 wherein said adder is a full digital adder.

4. The pulse-density modulator of claim 1 wherein said plurality of adders are connected as a ripple carry adder.

5. The pulse-density modulator of claim 2 wherein said circuit for initializing said latches is operative to reset said latches at power up of said pulse-density modulator.

6. The pulse-density modulator of claim 1 wherein said clock has a frequency at least as high as a frequency of application of input digital words.

7. A method for producing a pulse-density signal representing successive parallel digital input words, comprising:

adding in each of a plurality of adders, except an adder in a least-significant-bit position, a respective bit of a concurrent digital input word, a carry output of a next adder in a least-significant-bit order, and a latched value of a previous output of said adder;

adding in said adder in said least-significant-bit position, a respective bit of a concurrent digital input word and a latched value of a previous output of said adder;

latching a current value of each of said adders for a subsequent adding step;

latching a current value of one of said adders in a position of a most-significant-bit to provide a pulse density modulated output;

and repeating said steps at a predetermined clock frequency.

8. The method of claim 7 further comprising initializing a current value of each of said adders to a known value.

9. The method of claim 8 wherein said initializing setup is performed at power up of a pulse-density modulator.

10. The method of claim 7 further comprising establishing said predetermined frequency to be at least as high as a frequency of application of input digital words.

* * * * *

UNITED STATES PATENT AND TRADEMARK OFFICE
CERTIFICATE OF CORRECTION

| | | |
|---|---|---|
| PATENT NO. | : 5,995,546 | Page 1 of 1 |
| APPLICATION NO. | : 08/941516 | |
| DATED | : November 30, 1999 | |
| INVENTOR(S) | : Donald C. Richardson | |

It is certified that error appears in the above-identified patent and that said Letters Patent is hereby corrected as shown below:

Cover Page, insert Item [60] under Related U.S. Application Data

--Provisional Application No. 60/027,786 filed 10/04/1996.--

Signed and Sealed this

Nineteenth Day of June, 2007

JON W. DUDAS
*Director of the United States Patent and Trademark Office*